United States Patent [19]

El-Nokaly et al.

[11] Patent Number: 5,100,684

[45] Date of Patent: Mar. 31, 1992

[54] PROCESS OF USING SILICA TO DECREASE FAT ABSORPTION

[75] Inventors: Magda El-Nokaly, Hamilton; George D. Hiler, Harrison, both of Ohio

[73] Assignee: The Procter & Gamble Company, Cincinnati, Ohio

[21] Appl. No.: 674,500

[22] Filed: Mar. 25, 1991

[51] Int. Cl.[5] .................. A23L 1/059; A23L 1/216
[52] U.S. Cl. .................. 426/438; 426/102; 426/292; 426/296; 426/302; 426/637
[58] Field of Search .............. 426/302, 637, 438, 102, 426/292, 295, 296

[56] References Cited

U.S. PATENT DOCUMENTS

| | | | |
|---|---|---|---|
| 3,574,638 | 4/1971 | Nagel et al. | 426/102 |
| 3,669,681 | 6/1972 | Shoaf et al. | 99/86 |
| 4,016,337 | 4/1977 | Hsu | 426/99 |
| 4,103,038 | 7/1978 | Roberts | 426/601 |
| 4,375,483 | 1/1983 | Shuford et al. | 426/330 |
| 4,605,563 | 8/1986 | Heine et al. | 426/607 |
| 4,652,458 | 3/1987 | Frost et al. | 426/573 |
| 4,834,991 | 5/1989 | Porcello et al. | 426/94 |
| 4,917,908 | 4/1990 | Prosise | 426/102 |
| 4,925,692 | 5/1990 | Ryan | 426/531 |

OTHER PUBLICATIONS

Villota, et al., "Food Applications and the Toxicological and Nutritional Implications of Amorphous Silicon Dioxide", CRC Critical Reviews, vol. 23, No. 4, 1984.

*Primary Examiner*—Donald E. Czaja
*Assistant Examiner*—Helen Pratt
*Attorney, Agent, or Firm*—Rose Ann Dabek; Jerry J. Yetter; Richard C. Witte

[57] ABSTRACT

Potato pieces, for example, potato slices, french fries, and potato cubes or potato skins are prepared with a lower fat content by frying the potato pieces in an oil comprising from about 0.5 to about 2% of a hydrophobic silica. Alternatively, the potato pieces can be dipped in silica or water or oil containing silica.

14 Claims, No Drawings

PROCESS OF USING SILICA TO DECREASE FAT ABSORPTION

TECHNICAL FIELD

This invention relates to a process for lowering the oil absorbed by french fries by either coating the potato slices to be fried with certain silicas or by frying the potato pieces in an oil containing silica. Precipitated or fumed silicas of both the hydrophilic and hydrophobic type can be used.

BACKGROUND OF THE INVENTION

Potato pieces, i.e. slices, chips, potato skins and cubes are prepared by frying in oil. During this frying process, water is lost from the potato and oil is absorbed. Conventionally fried potato chips can absorb up to 35% fat or oil. French fries usually absorb up to about 16% fat or oil. Therefore, a method which could lower the amount of oil absorbed by the potato pieces without affecting fried flavor and texture is highly desirable.

It has been discovered that the addition of silica particles to an oil or to the surface of the potato, will decrease the amount of fat absorbed by the potato by 10% to 25%. This decrease in the absorption of fat can lower the fat content of $\frac{1}{4}''$ french fries from about 16% to about 12%, making a healthier food.

Silica materials have been added to oils to increase their viscosity. See, for example, U.S. Pat. No. 4,605,563 to Heine et al (1986). The viscosity of oils is increased by adding from 1 to 10% of a high melting glyceride and from 2 to 10% of a highly dispersed pyrogenic silica having submicron particles.

In *CRC Critical Reviews in Food Science and Nutrition*, Vilotta et al, "Food Applications and the Toxicological and Nutritional Implications of Amorphous Silicon Dioxide", 23 (4), (289-321) the food uses of silicas are described. In addition to their use as suspending agents or thickening/thixotropic agents in oils, they are added to foods for anti-caking and dispersion. See for example U.S. Pat. No. 4,375,483 issued to Shuford et al (salt is dispersed in an oil), U.S. Pat. No. 4,834,991 issued to Porcello et al (1989) (filler cream), U.S. Pat. No. 4,652,458 issued to Frost et al (1987) (lipid composition), U.S. Pat. No. 4,103,038 issued to Roberts (1978) (synthetic egg), and U.S. Pat. No. 3,669,681 issued to Shoaf et al (1972) (fat for toaster pastry).

Silica has also been used to remove impurities from oil.

Silicas have also been used to make coatings. For example, U.S. Pat. No. 4,016,337 issued to Hsu (1977) discloses a water-dispersible composition consisting of co-agglomerates of finely-divided silicon particles of a non-dispersible material (corn starch) and a silicon dioxide flowing agent. These co-agglomerates have a thin coating of an emulsion of an edible fat and glycerine.

Coatings have also been used to lower the fat content of a french fry. U.S. Pat. No. 4,917,908 issued to Prosise (1990) describes a method wherein the potato slice is coated with polyvinylpyrrolidine (PVP) before it is fried. The PVP makes a barrier around the fry keeping it from absorbing oil.

While silica has been previously added to oils, it is surprising that the addition of less than 2% of this material to a frying fat or oil affects the oil or fat levels in a fried potato product.

Accordingly, it is an object of this invention to produce a french fry or fried potato product having a 10% to 25% lower fat content than the same potato fried in oil without silica.

It is also an object of this invention to provide a method for lowering the fat content of french fries and other fried potato products by coating the potato piece with silica. These and other objects will be obvious from the description herein.

All percentages are by weight unless otherwise noted.

SUMMARY OF THE INVENTION

A process for lowering the fat absorption of french fries comprising frying potato pieces in an oil comprising from about 0.1 to 2% silica and from about 98% to 99.9% oil. Flavors, antioxidants, and other minor additives normally found in flavored vegetable oils or frying oils can be present.

An alternative method for preparing lower fat containing fried potatoes comprises dipping the potato pieces in oil containing from about 0.1% to 2% silica for at least 5 seconds, and preferably from about 5 seconds to about 20 seconds and then frying the potato pieces.

A third method of preparing these fried potatoes is to coat the fried foods by dipping in colloidal silica in water. From 15% to 50% is in this colloidal suspension.

DETAILED DESCRIPTION OF THE INVENTION

As used "oil" herein is meant to include natural and synthetic triglycerides which are liquid either at frying temperature or room temperature depending upon the process being used. These oils can be derived from animals or vegetables, or marine animals, and include fats which are solid at room temperature.

This invention is specific to a method for lowering the fat content of potato pieces which are fried in a fat or oil. The potato slices or pieces can be in the shapes of cubes, strips, either shredded or in a french fry form, potato skins which contain some potato adhering to it, or potato slices. Thus, fried potato products such as hash brown potatoes either made from potato chunks or shredded potatoes formed into a patty, potato chips, and french fried potatoes can be used in the practice of this invention. The potato slices can be freshly prepared or frozen. It is preferred that when the products are frozen, they are partially fried or parfried before freezing.

The silicas which are used herein are a very fine monomeric, polymeric or colloidal silicon dioxide, silicate or silica gel. Preferably a monomeric silica is used since it easily forms a glass-like film when it deposits on a surface. Silica is used in the art interchangeably with silica gel, amorphous silica, silicate, silicon dioxide and silicic acid. Fumed silica, precipitated silica and colloidal silica refer primarily to the way the small particles are formed. All of these products are predominately $SiO_2$. Some may be derivatized with an alkyl group, others contain hydroxyl groups.

Fumed silica has an average diameter of less than 50 nm, and usually is in the range of 7-40 nm. The particles have a surface area in the range of from 50 to 380m$^2$/g. Precipitated silicas are larger in particle size, ranging from 3000 to 100,000 nm with surface areas up to 675 m$^2$/g. The silicas used herein can have a surface area of from 50 to 700 m$^2$/g and a particle size of from 7 to 100,000 nm. Colloidal silicas are usually suspended in water (10% to 505 silica).

There are two types of silicas: hydrophilic and hydrophobic. For the process of lowering the absorption of fat by french fries and other porous foods, both types of silicas can be used. Both hydrophobic and the hydrophilic silicas are predominantly silicon dioxide.

The hydrophilic silicas are easily wetted with water. Their hydrophilic character is attributed to the presence of silanol groups (SiOH). The hydrophilic silica absorbs water and forms hydrogen bridges. These bridges between the dispersed phase and the dispersion medium, i.e. the silica and the water (on the potato surface) or oil, play an important role in the wetting process and absorption and desorption processes. Even in the absence of water, a silica - silica network forms through hydrogen bonding of these hydroxyl groups.

Hydrophobic silicas are chemically modified using halosilanes, alkoxysilanes, silazanes, and siloxanes. These materials form a chemical bond on the surface of the silicon dioxide with a carbon, i.e. a carbon-silicon bond is formed. Alkyl siloxanes include

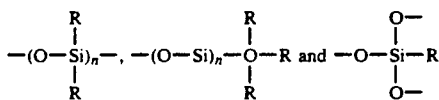

where R is $C_1$ to $C_{10}$. Usually the alkyl groups are the same, but they could be different, e.g. dimethyl ethyl siloxane. The hydrophobic silicas differ from the hydrophilic materials by having reduced water vapor absorption, and reduced silanol group density.

Both hydrophobic and hydrophilic silicas are available from Degussa Corporation (Ridgefield Park, New Jersey) under the trade names Aerosil. Silicas are also produced by Cabot (Tuscola, Illinois) under the name Cab-o-sil, Degussa (Germany) produce Sippernats, J.H. Huber, (Etowah, TN) produces Zeothix, Zeosyl and Zeofree, and Davison Chemical (W.R. Grace, Baltimore, MD) produces Syloids and Trysils.

Homogenization of the oil containing silica increased oil absorption in most of the fries compared to non-homogenized and control samples. Homogenization is reported to break silica network formation. Networking is done through hydrogen bonding between hydroxyl groups on the surface of the silica aggregates. Breaking such aggregates generates more surface area and hydroxyl groups available for oil absorption: i.e. more entrapped oil in silica to be deposited on fries. Thus, it is advantageous to encourage silica - silica networking. It forms a continuous filament that deposits as such on the surface of the potatoes.

Oils which can be utilized in the process of the present invention include triglycerides of $C_{12}$ to $C_{26}$ fatty acids. These materials can be derived from plants or animals or be synthetic fats or oils. For example, animal fats such as lard, tallow, oleo oil, oleo stock, oleo stearin and like, which are solid at room temperature can be utilized as a mixture with liquid oils or alone as long as they are liquid at frying temperatures. Liquid oils, e.g., unsaturated vegetable oils, can be used. These oils can be partially hydrogenated to convert some of the unsaturated double bonds of the fatty acid constituents into saturated bonds. Vegetable oils include soybean oil, hazelnut oil, linseed oil, olive oil, peanut oil, canola oil, safflower oil, rapeseed oil, cottonseed oil and sunflower seed oil.

Also suitable for use herein are the so-called low molecular weight synthetic fats which are certain tri- or diglycerides in which one or two of the hydroxyl groups of the glycerine have been esterified with acetic, propionic, butyric or caprionic acids and one or two of the remaining hydroxyl groups of the glycerine have been esterified with higher molecular weight fatty acids having from 12 to 22 carbon atoms.

Other common types of triglycerides or oils include: cocoa butter and cocoa butter substitutes, such as shea and illipe butter; milk fats, such as butter fat; and marine oils which can be converted into plastic or solid fats such as menhaden, pilcherd, sardine, whale and herring oils.

Many classes of reduced calorie fat, fat-like substances, or mixtures thereof, are suitable for use in the present compositions, to make up part or all of the lipid composition (from 10% to 100%). Medium chain triglycerides, highly esterified polyglycerol esters, polyoxyethylene esters and jojoba esters can be used.

Synthetic oils or fats which have been specifically tailored to provide calorie reduction benefits relative to conventional fats can be used. Of these, especially preferred are reduced calorie fats comprising at least about 15% by weight triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting of $C_{16}$ to $C_{26}$ saturated fatty acids, and mixtures thereof.

Other preferred fat-like materials include sucrose polyesters. Solid sucrose, polyesters, and processes for making them, are described in U.S. Pat. No. 4,005,195, Jandacek, issued Jan. 25, 1977, U.S. Pat. No. 3,600,186, Mattson et al., issued Aug. 17, 1971, U.S. Pat. No. 3,963,699, Rizzi et al., issued June 15, 1976, U.S. Pat. No. 4,518,772, Volpenheim, issued May 21, 1985, and U.S. Pat. No. 4,517,360, Volpenheim, issued May 14, 1985.

Sucrose polyesters are fat-like polymers comprising sucrose fatty acid ester compounds that contain four or more fatty acid ester groups which are substantially nondigestible and consequently non-absorbable by the human body. It is not necessary that all of the hydroxyl groups of the sucrose be esterified with fatty acid, but it is preferable that the sucrose contain no more than three unesterified hydroxyl groups, and more preferable that it contain no more than two unesterified hydroxyl groups. Most preferably, substantially all of the hydroxyl groups of the sucrose are esterified with fatty acid, i.e., the compound is substantially completely esterified. The fatty acids esterified to the sucrose molecule can be the same or mixed.

The fatty acids groups esterified to the sucrose molecule must contain from about 8 to about 22 carbon atoms, and preferably from about 14 to about 18 carbon atoms.

Preferred triglycerides include partially hydrogenated and unhydrogenated animal or vegetable oils which are liquid at room temperature. Solid fats, i.e. hydrogenated vegetable oils, and semisolid fats can also be used.

The preferred oils for frying french fries and potato chips are those which impart a positive flavor to the product. These include peanut oil, lard, tallow, cottonseed oil, soybean oil and mixtures of these oils. From the standpoint of providing a lower saturated fat product, unhydrogenated cottonseed oil, peanut oil and canola oil are preferred as the frying agents.

From about 0.1% to about 2% silica is added to the oil by dispersing or mixing, preferably from 0.2% to 1% is used. If the oil contains a hardstock component, that is a fat which is trisaturated (an iodine value below 12), the hardstock should be melted before dispersing the silica material. This enables the silica to be more homogeneously dispersed.

The potato pieces can also be coated with silica by spraying or dipping the pieces in silica powder or in an oil or colloidal dispersion of silica in water. The amount of silica on the potato is about 225 to about 400 ppm.

If the potato pieces are to be dipped into an oil containing a silica, a higher concentration of silica can be used. From about 1% to about 4% silica in oil or water is preferred for dipping; preferably from about 1% to about 2% is used. The dipping operation should be from about 5 to about 20 seconds to insure that the potato piece gets coated with the silica containing oil or water. The oil can be sprayed on the potato piece also. Alternatively the potato piece can be coated with 200 to 400 ppm dry silica and then fried.

The french fry or potato pieces are fried in a normal manner in the silica containing oil. When the pieces have been coated with silica, the coated pieces are fried in oil not containing silica. The frying temperature is usually from about 300° F. (148° C.) to about 375° F. (191° C.) for from 1–5 minutes depending upon the product, the temperature, and whether or not the potato pieces are fresh or were frozen or parfried.

This process and oil are primarily for frying french fries and other potato products. However, if the silica forms an impervious film on a food, it can be used to fry other foods as for example, chicken, fish, onion rings, batter dipped foods, e.g. vegetables and cheeses, fish, chicken and other meats. The film is made by depositing molecular silica from supersaturated solution. This deposition is described in Iler, R.K., *The Chemistry of Silica*, Wiley Interscience NY (1979). An impervious film is a monomeric coating. Colloidal silica forms a multilayer or porous film.

EXAMPLE 1

Fifty grams of Simplot Classic par-fried shoestring potatoes are fried for 3.25 minutes at 350° F. (176° C.) in two quarts of Crisco Oil containing 0.5% Aerosil 200 from Degussa. They are then allowed to drain for ten seconds in the wire basket before being transferred to a double thick Bounty towel. After cooling for approximately four minutes they are frozen until they could be extracted. The sample is extracted for six hours in a Soxhlet extractor with dichloromethane. The dichloromethane is dried overnight with magnesium sulfate, filtered, washed with excess dichloromethane and is evaporated to dryness. The weight of fat in the fifty gram sample is then determined. The entire procedure is repeated four more times to obtain a meaningful average. When compared to potatoes fried in pure Crisco Oil it is found that potatoes fried in oil with silica contained 13.6% less fat. Crisco Oil is a vegetable oil containing soybean oil. Aerosil 200 is a hydrophilic silica.

EXAMPLE 2

Using the procedure in Example 1 a 20.35% reduction in fat compared to control product is achieved by adding 0.5% Aerosil R974 from Degussa to the frying oil. Aerosil R974 is a hydrophobic silica having a dimethylsilane moiety

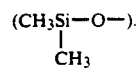

EXAMPLE 3

Using the procedure in Example 1 a 25.16% reduction in fat compared to control product is achieved by adding 0.5% Aerosil R02 from Degussa to the frying oil. Aerosil R202 is a hydrophobic silica having

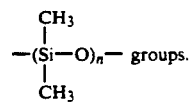

EXAMPLE 4

Using the procedure in Example 1 a 22.0% reduction in fat compared to control product is achieved by adding 0.5% QUSO WR55FG to the frying oil. QUSO is a hydrophobic precipitated silica from Degussa.

EXAMPLE 5

Simplot Classic par-fried shoestring potatoes are dipped for eight seconds in hot (350° F., 176° C.) Crisco Oil containing 1% Aerosil 200 from Degussa, a hydrophilic fumed silica when these potatoes are fried in Crisco Oil at 350° F. (176° C.); they absorb 10.11% less fat than the control product.

EXAMPLE 6

The procedure in Example 5 is followed except before the fries are fried in Crisco Oil they are dipped for eight seconds in Ludox AM colloidal silica gel from E.I. DuPont De Nemours & Company, Wilmington, Delaware. A 11.64% reduction in fat is achieved compared to control product.

EXAMPLE 7

The procedure in Example 5 is followed except before the fries are fried in Crisco Oil they are dipped for eight seconds in a 10% solution of potassium silicate from Pfaltz & Bauer. A 11.74% reduction in fat is achieved.

EXAMPLE 8

Fresh french fry potato pieces are parfried in an oil containing 0.5% Aerosil 200 Silica (from Degussa). The fries are frozen and then finished fried in a vegetable oil. Compared to fries parfried without the silica a 16% reduction in fat content is achieved.

EXAMPLE 9

Fresh fries are dipped in 1% silica in oil and then parfried in vegetable oil. After these are frozen and refried in vegetable oil without silica at 6% reduction in fat is shown.

What is claimed is:

1. A process for lowering the fat absorption of fried potato pieces comprising frying potato pieces in an oil comprising from about 0.1% to about 2% hydrophobic silica having a particle size of between about 7 and about 100,000 nm and from about 98% to about 99.9%

2. A process according to claim 1 wherein said potato pieces are selected from the group consisting of french fries, potato slices, and potato skins.

3. A process according to claim 2 wherein said oil is selected from the group consisting of soybean oil, canola oil, rapeseed oil, hydrogenated soybean oil, sunflower seed oil, peanut oil, cottonseed oil tallow, lard and mixtures thereof.

4. A process according to claim 3 wherein said silica comprises from about 0.2% to about 1%.

5. A process for lowering the fat absorption of fried potato products, comprising coating potato pieces with oil comprising from about 1% to about 4% hydrophobic silica having particle size of between about 7 and about 100,000 nm and from about 96% to about 99% oil.

6. A process according to claim 5 wherein said potato pieces are dipped in oil containing silica for from about 5 seconds to about 1 minute.

7. A process according to claim 6 wherein said potato pieces are selected from the group consisting of french fries, potato slices, and potato skins.

8. A process according to claim 7 wherein said oil is selected from the group consisting of soybean oil, canola oil, rapeseed oil, hydrogenated soybean oil, sunflower seed oil, peanut oil, and cottonseed oil.

9. A process according to claim 8 wherein said silica comprises from about 0.3% to about 0.5% in oil.

10. A process for lower fat absorption of fried food comprising coating food with from about 225 ppm to about 400 ppm hydrophobic silica and having a particle size between about 7 and about 100,000 nm.

11. A process according to claim 10 wherein said food is potato pieces selected from the group consisting of french fries, potato slices, and potato skins.

12. A process according to claim 11 wherein said oil is selected from the group consisting of soybean oil, canola oil, rapeseed oil, hydrogenated soybean oil, sunflower seed oil, peanut oil, and cottonseed oil.

13. A process according to claim 10 wherein said food is dipped in water containing from about 10% to about 50% colloidal silica.

14. A process according to claim 13 wherein the concentration of the silica in water is from 15% to 20%.

* * * * *